United States Patent [19]
Peltier et al.

[11] 3,869,055
[45] Mar. 4, 1975

[54] TRANSFER APPARATUS
[75] Inventors: Henri Peltier, Chatillon; Pierre Chatourel, Chaville; Roger Bailly, Meudon, all of France
[73] Assignee: Regie National des Usines Renault, Boulogne-Billancourt, France
[22] Filed: Sept. 4, 1973
[21] Appl. No.: 393,857

[30] Foreign Application Priority Data
Sept. 22, 1972 France .............................. 72.33790

[52] U.S. Cl. ............... 214/151, 104/147 R, 188/33, 214/1 B, 214/1 C
[51] Int. Cl. ............................................ B25j 11/00
[58] Field of Search .............. 104/165, 147; 105/73; 214/1 BC, 1 BH, 1 R, 151; 188/33, 38, 41, 42

[56] References Cited
UNITED STATES PATENTS
2,974,811  3/1961  Dammert et al. ................. 214/1 BC
3,161,145  12/1964  Cargill et al. .................... 104/178 X
3,675,583  7/1972  Sobey et al. ................ 104/147 R X Primary Examiner—Frank E. Werner

[57] ABSTRACT

An apparatus for transferring objects includes a carriage mechanism mounted by rollers on a pair of moving support surfaces. The support surfaces are driven at uniform but different rates, with the mounting rollers being permitted to roll freely on the slow surfaces to compensate for the differential rates. Means are provided for selectively braking the fast mounting rollers relative to their own axis of rotation to thereby vary the rolling resistance or moment of friction between the rollers and the fast support surface to thereby accelerate or decelerate the carriage mechanism.

19 Claims, 4 Drawing Figures

TRANSFER APPARATUS

BACKGROUND OF THE INVENTION

1. Field of the Invention

The present invention relates to apparatus for transferring objects, intended for automatic production plants in which these objects or units should be conveyed on carriages from one processing station to another. More particularly, this invention relates to such an apparatus having improved and simplified means for producing uniform, controlled acceleration and deceleration of the objects being transferred.

2. Description of the Prior Art

Transfer mechanisms of this kind are commonly of the intermittent motion type, employing carriage means which move the units from one station to the other by means of transfer rods displaced alternatingly and actuated by jacks or by mechanical elements linked to the cycle of the machinery. Transfer mechanisms of the continuous type are also known, in the form of chain-driven conveyors.

These mechanisms have the disadvantage of inflicting violent starting and stopping accelerations on the objects carried, which accelerations are incompatible at times with the weight, strength or nature of the objects.

French Pat. specification No. 72 17 462 discloses a device for controlling the speed of a carriage operated by a linear electric motor comprising damping means assuring some control of the acceleration and decelerations; this device remains limited, however, in respect of the weight of the objects carried, as well as by the nature of its method of electrical propulsion.

In mechanized foundries, for conveying casting ladles containing liquid metal, in which the substantial weight of the full ladle, the inertia of the liquid, the safety requirements, the thermal strains, and the dusty atmosphere, conventional transfer machinery cannot be used.

SUMMARY OF THE INVENTION

The present invention provides apparatus arranged to transfer objects on a carriage from one station to another in a production plant. The carriage being mounted on rollers which run on two continuously driven conveyor tracks arranged to travel at different speeds, the roller or rollers running on the faster track having braking means whose application causes increased friction with the track with the consequent acceleration of the carriage.

Thus, if a roller running on the fast track is braked, the fact that it rests on the fast track ensures the entrainment of the carriage at a speed approaching that of the fast track, the other rollers rolling freely on the slower tracks. The braking action may be controlled so that the moment of friction on the braked roller is considerably greater than the moment of friction of the roller or rollers in contact with the slower track, so that its moment of friction predominates.

In a preferred embodiment, contact between a brake actuator member of the roller and a released cam (which may be stationary or installed on an adjacent carriage) will free this roller and will allow the carriage to decelerate from the speed of the fast track and approach the speed of the slow track, if the moment of friction of the rollers of the slow track predominates. The deceleration thus depends on the inertia of the objects and the residual moment of friction.

From the approach speed of the slow track, the carriage may be stopped at the processing station required, by means of a simple withdrawable stop. The carriage being stationary, the rollers will continue to revolve at their intrinsic speed of rotation, on their corresponding tracks. The withdrawal of the stop will again cause the entrainment of the carriage by the rollers of the slow tracks, the roller of the fast track remaining unbraked to prevent its entraining action being added to that of the other rollers and thus causing too violent an acceleration upon starting off.

As soon as the speed of the slow track is reached, the braking system of the high-speed roller is engaged again, so that the carriage gradually approaches the speed of the fast track.

The coefficient of friction between the rollers and the track surface is such that, in case of an accidental stoppage of the carriage, the rollers can slip on their tracks, thereby serving as an overload safety system.

The result is a transfer mechanism which is uncomplicated and reliable, and easily controlled by simple adjustment of the braking friction.

BRIEF DESCRIPTION OF THE DRAWINGS

The invention will be described further, by way of example only, as applied to the conveying of casting ladles in a mechanized foundry, with reference to the accompanying drawings, in which.

DESCRIPTION OF THE PREFERRED EMBODIMENTS

Figure 1:
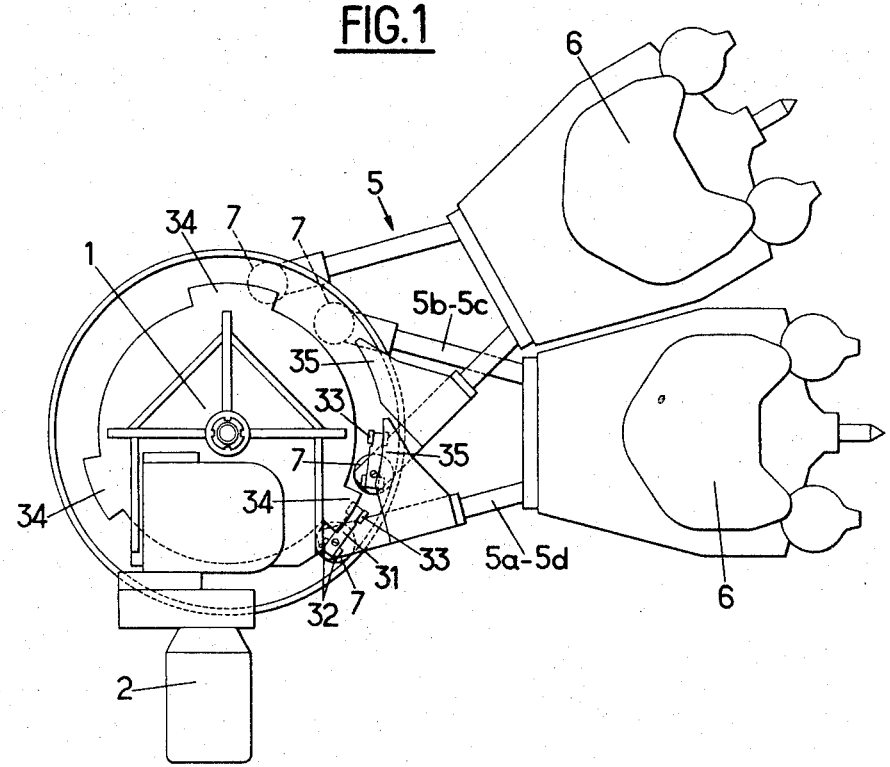
FIG. 1 is a plan view of a casting turntable, showing two carriages.
Figure 2:
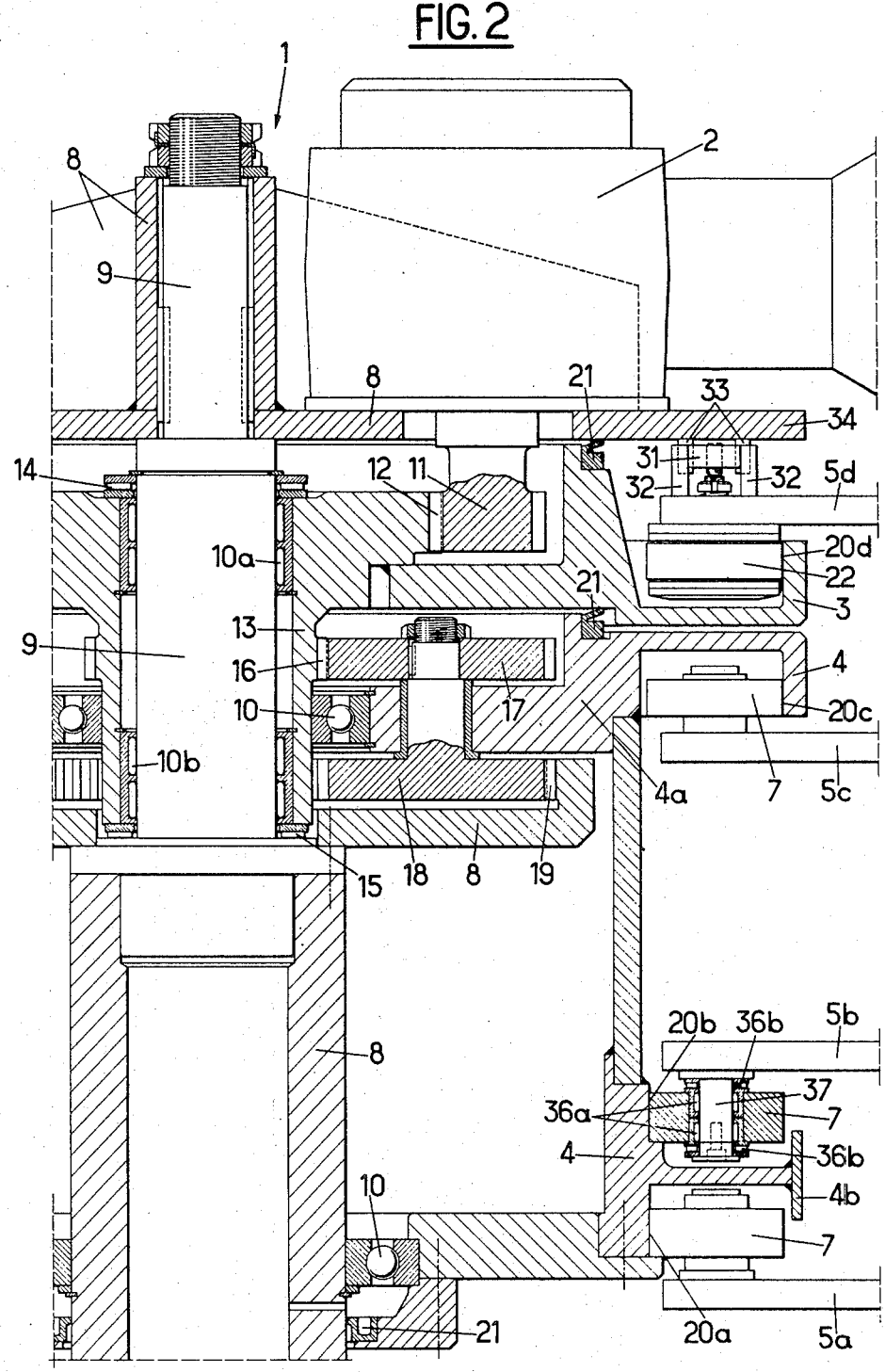
FIG. 2 is a fragmentary sectional view, on an enlarged scale, of a portion of the mechanism shown in FIG. 1 and illustrating the structure for driving the tracks.

The turntable illustrated in FIG. 1 is intended to feed machines for centrifugal casting of elements such as cylinder liners. It comprises a central shaft 1 containing the driving mechanism, with its motor reduction gear assembly 2, slow driving tracks formed by a pair of vertically spaced circular rings 4, and a simple fast driving track formed by a circular ring 3 (FIG. 2). The ring 3 is situated above the rings 4. A pair of carriages 5, each adapted to carry a metering casting ladle 6, are mounted on tracks by means of slow rollers 7 and fast rollers 22.

Three ladle stopping stations are defined, being respectively, a casting station, a cleaning station, and a station for refilling and for weighing of the metal. Neither these stations nor the items of equipment of their operation will be otherwise described, their purpose lying outside the scope of the invention.

The central shaft 1 has a stationary frame 8 carrying the motor reduction gear assembly 2. The shaft 1 also has a stationary central spindle 9 carrying the bearings 10 of the fast track 3 and slow track 4.

The output pinion 11 of the motor reduction gear assembly 2 transmits drive directed to a gearwheel 12 rigidly joined with the fast track 3. This gearwheel 12 is extended along the central spindle 9 by a tubular shaft 13 revolving freely on this spindle by virtue of two needle roller bearings 10a and 10b and located between two axial thrust roller bearings 14 and 15.

Gear teeth 16 of this shaft 13 entrain a planetary gear 17 journalled in the upper part 4a of the framework of the slow track 4 and extended at the other side by a planetary gear 18 in unit with the gear 17 and meshing with a stationary ring gear 19 of the framework 8. The gears 17 and 18 thus form an epicyclic reduction gear for driving a slow track 4, which has a plurality of rolling surfaces or runways 20a, 20b and 20c offering a substantial bearing surface for the plurality of rollers 7 of the ladle-bearing framework 5. The bearings and gears are protected by seals 21.

The three slow supporting runways 20a, 20b, 20c and the fast runway 20d are grouped into two vertically spaced pairs, with the upper pair including slow runway 20c and fast runway 20d and the lower pair consisting of the slow runways 20a, 20b.

A flange 4b is incorporated between the two lower runways 20a and 20b to prevent accidental lifting of the ladle carriages.

As is apparent from FIGS. 1 and 2, the arms carrying the rollers 7 and 22 are grouped in vertical planes extending at an angle with respect to the vertical symmetry plane of the support 5, into two arms 5a and 5d corresponding to the runways 20a and 20d at one side of the symmetry plane of the framework 5, and into two arms 5b and 5c corresponding to the runways 20b and 20c at the other side. Moreover, the arms 5a and 5d are spaced apart by a greater distance than the arms 5b and 5c. This arrangement enables two closely spaced arms 5b and 5c of a carriage to penetrate between the widely spaced arms 5a and 5d of the adjacent carriage and to reduce the storage bulk of the carriages to a minimum while assuring them of a wide base of support.

The upper track 3 ensures entrainment at high speed, the three lower tracks 4 in unit with each other, ensuring entrainment at a low speed, referred to as the approach speed.

Figure 3:
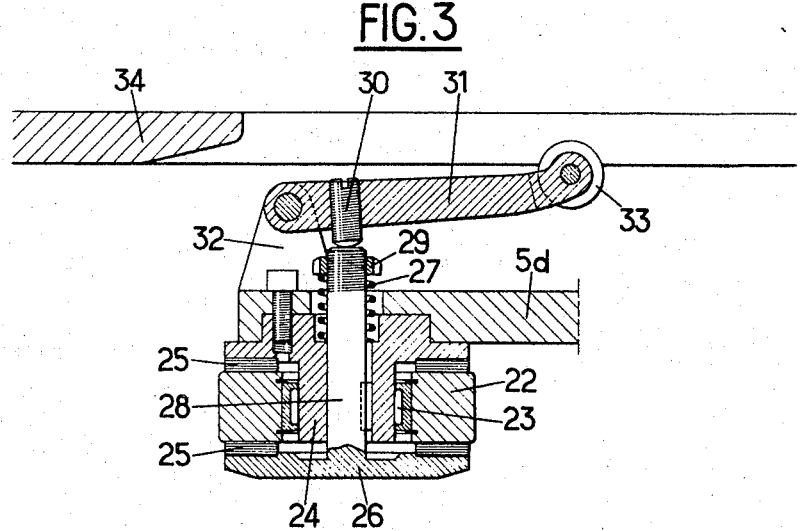
FIG. 3 shows a cross section of the high-speed driving roller and of the system for braking it in rotation.

FIG. 3 illustrates the upper high speed driving roller 22 as well as its braking system, in cross section. Thus, it is seen that roller 22 is mounted by means of a needle roller bearing 23 on a journal 24 in unit with the corresponding arm 5d of the carriage 5. Lateral brake linings 25 bear on the sides of the roller 22, bearing against the outer end surface of the journal 24 on the one hand, and against the inner surface of a clamping flange 26 on the other hand. The flange 26 is extended by a central rod 28 which passes through the journal 24, the flange 26 being held in braking application by means of a spring 27 coaxial with the said rod 28 and adjustable by means of the nut 29 screwed on the extremity of the rod 28.

The release of the braking system is performed by action of an adjustable stop 30 on a lever 31. One end of the lever is hinged on a lug 32 integral with the arm 5d, and the other end receiving a cam follower in the form of a double roller 33 intended to roll onto fixed bearing release cams 34. Depression of the roller 33, and thus of the rod 28, allows free rotation of the roller 22 about its axis and over the surface of runway 20d, thereby permitting deceleration of the carriage 6 because of the intrinsic friction of the other rollers 7 of the slow tracks.

As is apparent from FIG. 1, the rollers 33 of one carriage may also be actuated by release cams 35 in unit with the arm 5d of the adjacent carriage so as to prevent any violent collision of the carriages.

The fixed cams 34 are situated on the framework 8, in accordance with the reductions in speed required before the stopping stations, whereas the cams 35 allow reductions in speed for stowage against the preceding ladle carriage.

The roller 7 cooperating with the runway 20b is illustrated in cross section in FIG. 2. It is apparent that this roller is freely rotatable on a needle roller bearing 36a between two axial thrust roller bearings 36b, and is mounted on a pin 37 in unit with the corresponding arm 5b of the bearer 5.

The example described above shows the application of the invention to the circular tracks of a turntable, with carriages in overhanging position. The invention may also be applied to non-circular tracks, for example linear tracks, the roller bearing tracks in this case being continuous conveyor belts whereon are placed or gripped the rollers of the bearer carriages.

Figure 4:
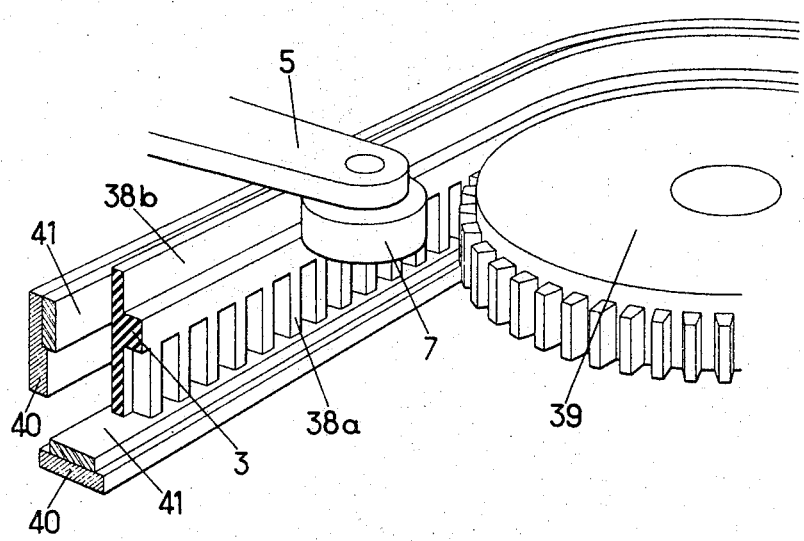
FIG. 4 shows, in perspective, part of another form of embodiment wherein the tracks produce a linear displacement by means of endless belts.

By way of example, FIG. 4 shows a carriage framework 5 supported at one side as in the example described above. The driving tracks 3 no longer consist of circular rings but of belts comprising a toothed inner portion 38a drawn along by toothed driving wheels 39, and a flat inner portion 38b, on which the rollers 7 roll. The flexibility of the belts imposes the need to provide backing at their outer surface and along their lower edge by means of a rigid stationary bearing flange 40 lined with a wearing strip 41, for example produced from a synthetic substance having a low coefficient of friction such as "Delrin" (Trademark) manufactured by Societe Du Pont de Nemours. The belt is thus held in a vertical plane and in a horizontal plane.

What is claimed is:

1. An article transport apparatus comprising a pair of support tracks, drive means for driving one of said tracks at a slow speed and the other said track at a fast speed, an article carriage, first roller means mounted on said carriage and engaging said slow track, second roller means mounted on said carriage and engaging said fast track, said first and second roller means cooperating to support said carriage on said tracks, and braking means for braking said second roller means to thereby accelerate said carriage.

2. Apparatus as claimed in claim 1 in which the path of the carriage includes a number of stopping stations, and brake control means arranged to release the braking means during the approach to and at each station.

3. Apparatus as claimed in claim 1 wherein said support tracks are constituted by a plurality of circular rings arranged one above another, said drive means having operable to rotate said rings about a common axis with one of said rings being driven at a higher speed than the others.

4. Apparatus as claimed in claim 3 wherein said drive means includes a drive source directly driving said fast ring and epicyclic reduction gear means for driving the other said rings.

5. Apparatus as claimed in claim 1 wherein said support tracks comprise endless belts.

6. Apparatus as claimed in claim 5 wherein said belts have toothed surfaces adapted to cooperate with toothed driving wheels, the belts also having smooth surfaces on which said rollers run.

7. Apparatus as claimed in claim 6 further comprising rigid stationary flanges adapted to engage and support the belts against the thrust of said rollers.

8. Apparatus as claimed in claim 1 wherein said braking means is adjustable and comprises brake linings co-operating with a braking surface of the roller, a spring-loaded clamping member normally urging said brake lining into engagement with said braking surface, and means for engaging and moving said lever to release said braking means.

9. Apparatus as claimed in claim 8, wherein said adjustable braking means further comprises a stationary cam arranged to cooperate with a cam follower, and a cam mounted on the carriage itself in position to cooperate with the cam follower of an adjacent carriage.

10. Apparatus as claimed in claim 1 having a plurality of carriages thereon, each carriage comprising four arms each having one of said rollers mounted thereon, the arms of each said carriage being grouped in pairs in two vertical planes which diverge with respect to the vertical symmetry plane of the carriage, the spacing between one pair of arms being different from that of the other pair so that the more closely spaced arms of one carriage may penetrate between the more widely spaced arms of an adjacent carriage.

11. An article transport apparatus comprising a plurality of movable support tracks, drive means moving said tracks about fixed paths with one of said tracks being driven at a faster rate than another of said tracks, a carriage, a plurality of rollers mounted on said carriage and engaging said support tracks to support said carriage thereon, at least one said roller engaging said faster track, and selectively operable means for increasing the frictional contact between said faster track and said one roller.

12. The article transport apparatus as defined in claim 11 wherein said plurality of support tracks includes one track driven at a relatively fast rate and at least two tracks driven at a slower rate, the rolling friction between said rollers and said support tracks tending to drive said carriage in the direction of movement of said tracks.

13. The article transport apparatus as defined in claim 12 wherein said selectively operable means includes selectively operable braking means for braking said roller engaging said fast track.

14. Apparatus as claimed in claim 13 in which the path of the carriage includes a number of stopping stations, and brake control means arranged to release the braking means during the approach to and at each station.

15. The article transport apparatus as defined in claim 12 wherein said plurality of support tracks are circular and arranged in spaced coaxial relation to one another.

16. Apparatus as claimed in claim 15 wherein said drive means includes a drive source directly driving said fast track and epicyclic reduction gear means for driving the other said tracks.

17. Apparatus as claimed in claim 11 wherein said support tracks comprise endless belts.

18. Apparatus as claimed in claim 17 wherein said belts have toothed surfaces adapted to cooperate with toothed driving sheels, the belts also having smooth surfaces on which said rollers run.

19. Apparatus as claimed in claim 18 having a plurality of carriages thereon, each carriage comprising four arms each having one of said rollers mounted thereon, the arms of each said carriage being grouped in pairs in two vertical planes which diverge with respect to the vertical symmetry plane of the carriage, the spacing between one pair of arms being different from that of the other pair so that the more closely spaced arms of one carriage may penetrate between the more widely spaced arms of an adjacent carriage.

* * * * *